(12) United States Patent
Langtry et al.

(10) Patent No.: US 8,944,364 B2
(45) Date of Patent: Feb. 3, 2015

(54) QUIET LANDING GEAR DOOR

(71) Applicants: Robin B. Langtry, Burien, WA (US); Drew A. Wetzel, Everett, WA (US)

(72) Inventors: Robin B. Langtry, Burien, WA (US); Drew A. Wetzel, Everett, WA (US)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 13/689,766

(22) Filed: Nov. 30, 2012

(65) Prior Publication Data

US 2014/0151498 A1  Jun. 5, 2014

(51) Int. Cl.
*B64C 23/00* (2006.01)
*B64C 25/16* (2006.01)
*B64C 25/00* (2006.01)

(52) U.S. Cl.
CPC .............. *B64C 23/005* (2013.01); *B64C 25/16* (2013.01); *B64C 2025/003* (2013.01)
USPC ..................... 244/1 N; 244/100 R; 244/129.5

(58) Field of Classification Search
USPC ........... 244/1 N, 100 R, 102 A, 102 R, 129.1, 244/129.4, 129.5
See application file for complete search history.

(56) References Cited

U.S. PATENT DOCUMENTS 4,408,736 A * 10/1983 Kirschbaum et al. ...... 244/100 R
2006/0060707 A1 * 3/2006 Chow et al. ................ 244/129.4

* cited by examiner

*Primary Examiner* — Philip J Bonzell
*Assistant Examiner* — Nicholas McFall
(74) *Attorney, Agent, or Firm* — Ameh IP; Elahe Toosi; Lowell Campbell

(57) ABSTRACT

A quiet landing gear door and methods are presented. A landing gear door comprises a trailing edge and a leading edge and is operable to deploy to a landing gear door deployed position. A door flap comprises the trailing edge and is hinged to the landing gear door. The door flap deflects toward a landing gear strut to a door flap deployed position in response to deployment of the landing gear door. A leading edge section comprises the leading edge and is coupled to the door flap. The leading edge section deflects toward the landing gear strut to a leading edge deployed position in response to deployment of the landing gear door.

20 Claims, 10 Drawing Sheets

QUIET LANDING GEAR DOOR

FIELD

Embodiments of the present disclosure relate generally to landing gear structures. More particularly, embodiments of the present disclosure relate to landing gear doors.

BACKGROUND

Increasing aircraft noise regulations necessitate reductions in aircraft noise. While engine noise is generally considered a main source of aircraft noise during take-off, interaction of air turbulence with aircraft structures may also be a source of noise. Furthermore, during a low engine power landing, interaction of the air turbulence with the aircraft structures may be a primary source of noise.

SUMMARY

A quiet (low noise or reduced noise) landing gear door and methods are presented. A landing gear door comprising a trailing edge and a leading edge deploys to a landing gear door deployed position. A door flap hinged to the trailing edge deflects toward a landing gear strut to a door flap deployed position in response to deployment of the landing gear door. A leading edge section deflects toward a landing gear strut to a leading edge deployed position in response to deployment of the landing gear door.

In this manner, embodiments of the disclosure provide a quiet landing gear door that reduces noise generated by interaction of a landing gear wake with an aerodynamic surface.

In an embodiment, a quiet landing gear door comprises a landing gear door, a door flap, and a leading edge section. The landing gear door comprises a trailing edge and a leading edge and deploys to a landing gear door deployed position. The door flap comprises the trailing edge and is hinged to the landing gear door. The door flap deflects toward a landing gear strut to a door flap deployed position in response to deployment of the landing gear door. The leading edge section comprises the leading edge and is coupled to the door flap. The leading edge section deflects toward the landing gear strut to a leading edge deployed position.

In another embodiment, a method for reducing landing gear wake-wing flap interaction noise deploys a landing gear door comprising a trailing edge and a leading edge. The method further deflects toward a landing gear strut a leading edge section comprising the leading edge and coupled to the landing gear door. The method also deflects toward the landing gear strut a door flap comprising the trailing edge and hinged to the landing gear door. The method further reduces a flow velocity on a pressure side of the landing gear door due deflecting the bullnose and the door flap.

In a further embodiment, a method for configuring a quiet landing gear door, configures a landing gear door to deploy to a landing gear deployed position. The method couples a leading edge section and a door flap to the landing gear door. The method then configures the leading edge section and the door flap to deflect toward a landing gear strut in the landing gear deployed position to reduce a local flow speed near the landing gear strut and minimize a wake impinging on a pressure side of an aerodynamic surface of an aircraft such that a landing gear noise and a landing gear wake-aerodynamic surface interaction noise are reduced.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft landing gear door, aircraft landing gear door operation, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
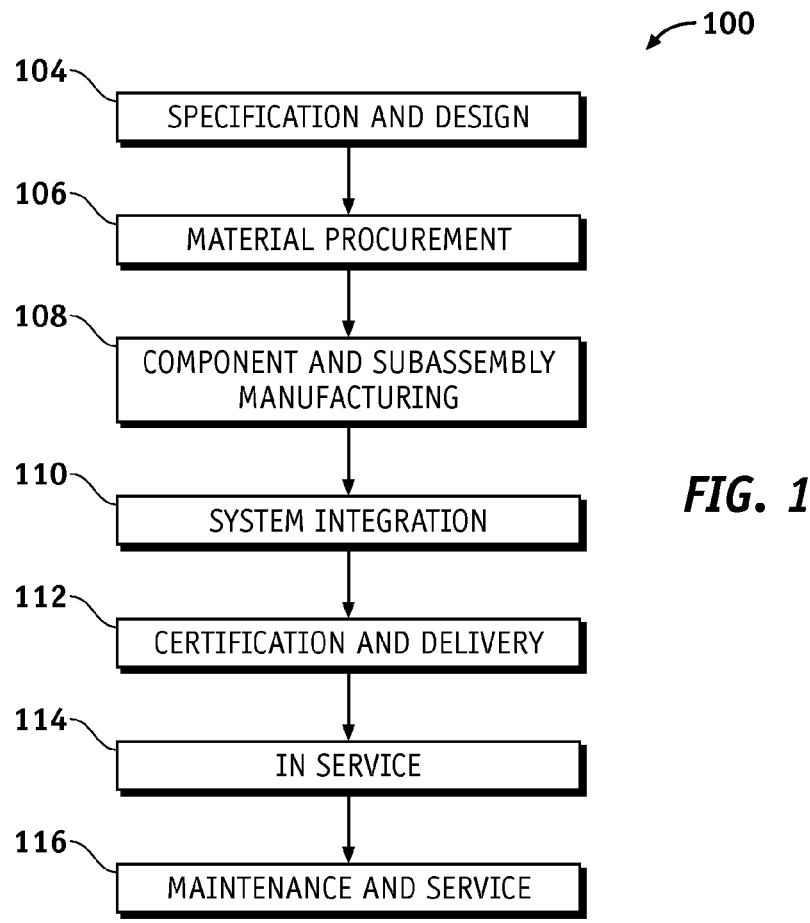
FIG. 1 is an illustration of a flow diagram of an exemplary aircraft production and service methodology.
Figure 2:
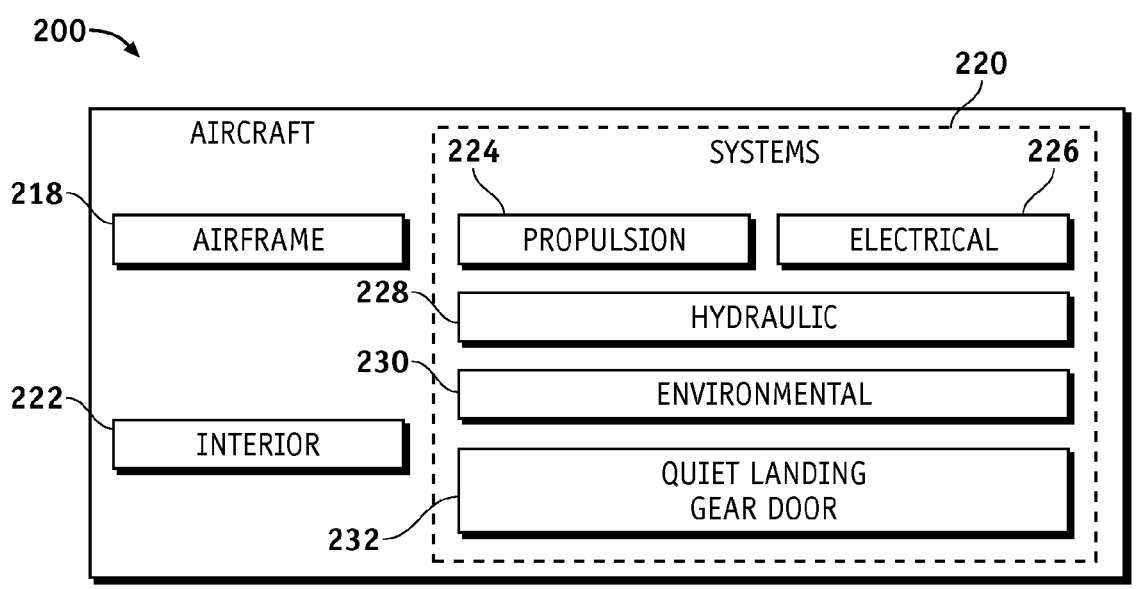
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and integration of system 110 (system integration 110) of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 1, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a quiet (low noise) landing gear door 232. Any number of other systems may also be included. In this document, quiet may mean, for example but without limitation, low noise, reduced noise, or attenuated noise.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
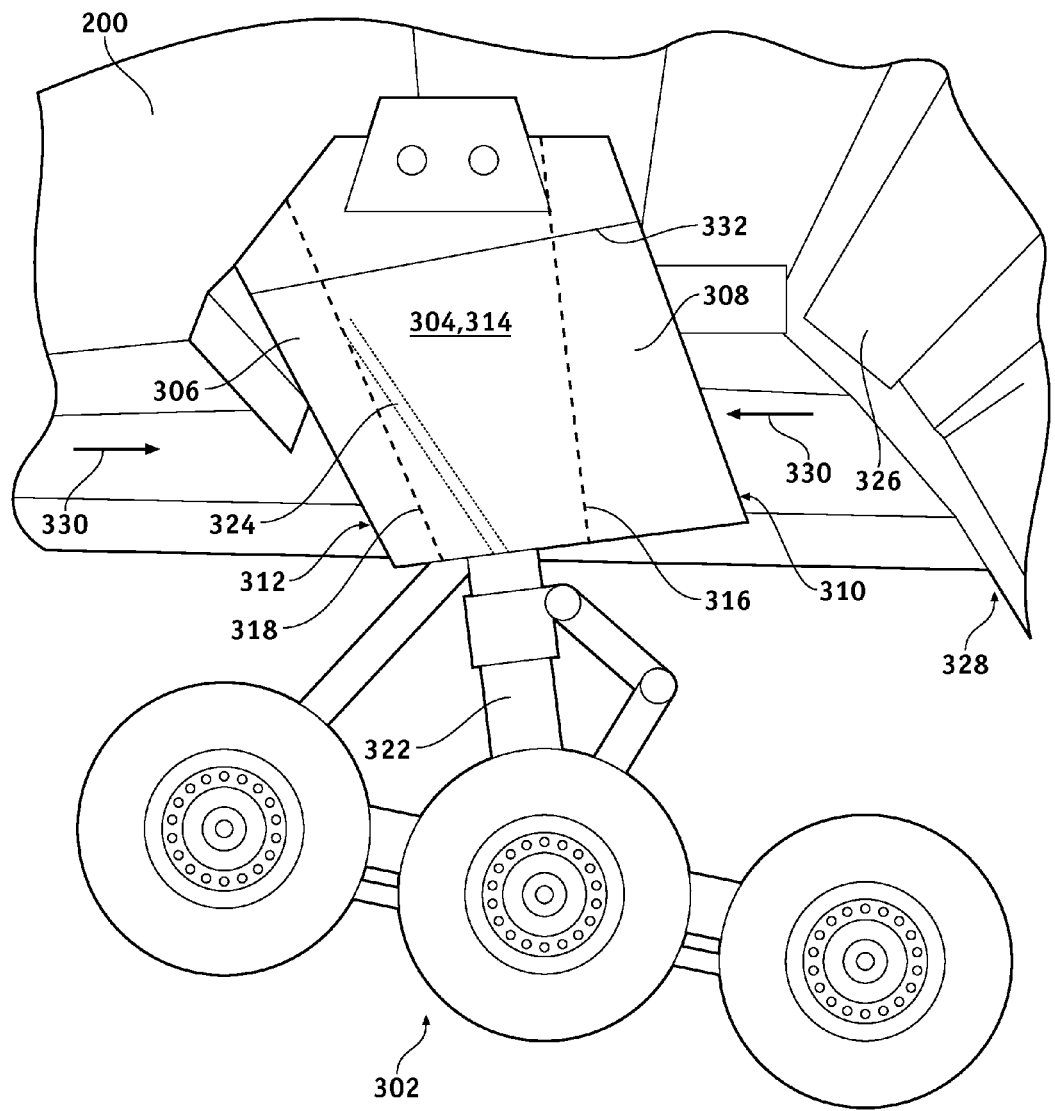
FIG. 3 is an illustration of an exemplary perspective view of a portion of an aircraft showing a landing gear structure comprising a landing gear door coupled thereto according to an embodiment of the disclosure.

FIG. 3 is an illustration of an exemplary perspective view 300 of a portion of an aircraft 200 showing a landing gear structure 302 comprising a landing gear door 304 coupled thereto according to an embodiment of the disclosure. The landing gear door 304 may be coupled to an aircraft such as the aircraft 200 and may comprise a leading edge section 306, and a door flap 308.

The landing gear door 304 comprises a trailing edge 310 and a leading edge 312 and is configured to deploy to a main landing gear door deployed position 314 as shown in FIG. 3. The landing gear door 304 may be coupled to the landing gear structure 302 of the aircraft 200.

Figure 5:
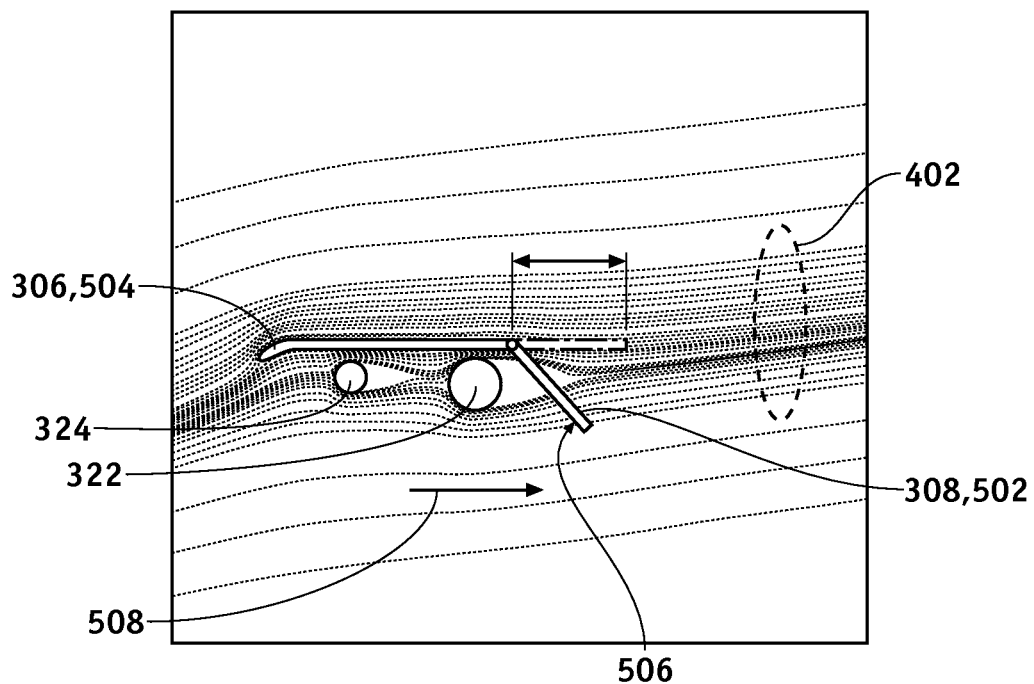
FIG. 5 is an illustration of an exemplary section view of a landing gear door in a deployed position according to an embodiment of the disclosure.
Figure 6:
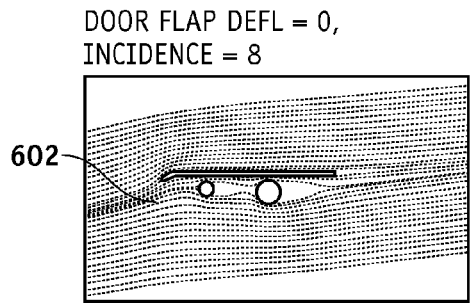
FIGS. 6-12 are illustrations of section views showing a free stream flow over a landing gear door at various door flap deflection angles according to an embodiment of the disclosure.
Figure 7:
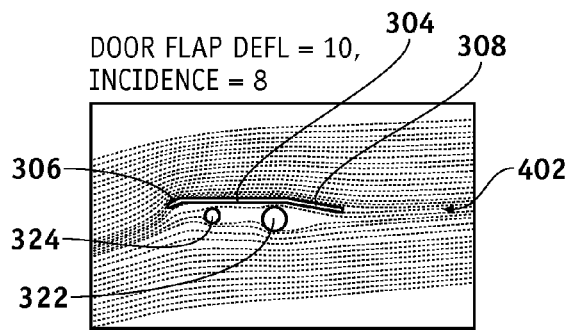
Figure 8:
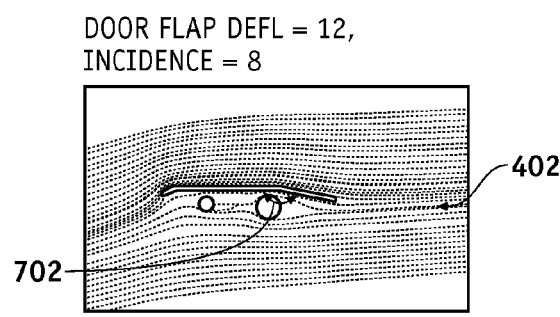
Figure 9:
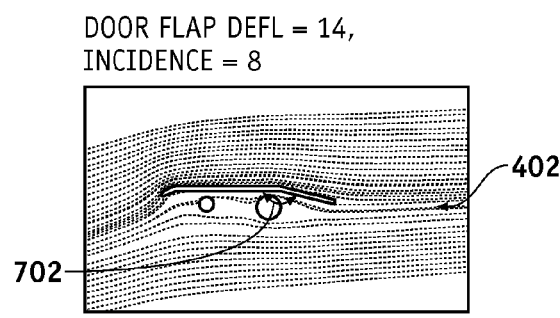
Figure 10:
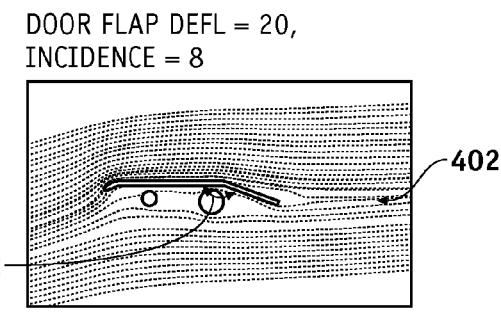
Figure 11:
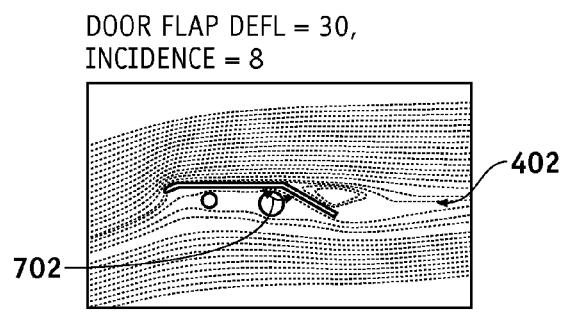
Figure 12:
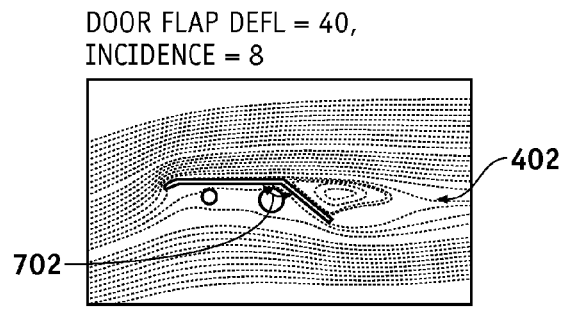

The door flap 308 comprises the trailing edge 310 and is hinged to the landing gear door 304 via a trailing edge hinge line 316. The door flap 308 is configured to deflect in a direction 330 toward a landing gear strut 322 to a door flap deployed position 502 (e.g., as shown in FIG. 5) in response to deployment of the landing gear door 304. The door flap 308 may be located, for example but without limitation, at about 50 percent to about 60 percent of a chord plane 332 of the landing gear door 304, or other location on the chord plane 332 suitable for operation of the landing gear door 304. The door flap 308 may also be coupled to the landing gear door 304 via a shape memory alloy (SMA) material that can deflect in response to a temperature change, or via other coupling means that can position the door flap 308 at a deflected position when the landing gear door 304 is deployed.

The leading edge section 306 comprises the leading edge 312 and is coupled to the landing gear door 304. The leading edge section 306 is configured to deflect in the direction 330 toward the landing gear strut 322 to a leading edge deployed position 504 (e.g., as shown in FIG. 5) in response to deployment of the landing gear door 304. The leading edge section 306 may comprise, for example but without limitation, a bullnose fixedly coupled to the landing gear door 304, a drooped leading edge hinged to the landing gear door 304 via a leading edge hinge line 318, a drooped leading edge coupled to the landing gear door 304 via a shape memory alloy (SMA) material that can deflect in response to a temperature change, or other leading edge section that can be positioned at a deflected position when the landing gear door 304 is deployed.

In operation, when the landing gear door 304 is in the main landing gear door deployed position 314, the leading edge section 306 in the leading edge deployed position 504, and the door flap 308 in the door flap deployed position 502 a flow circulation is generated around the landing gear structure 302, which reduces a flow velocity on a side of the landing gear strut 322.

In this manner, landing gear wake-wing flap interaction caused by a landing gear wake 402 (FIGS. 4 and 5) from the landing gear strut 322 and the landing gear braces 324 impinging on a pressure side 326 of the wing flap 328 is reduced thereby reducing noise caused by such interaction.

Reducing the landing gear wake-wing flap interaction increases effectiveness of the wing flap 328 by reducing a strength of the landing gear wake 402 from the landing gear door 304 impinging on the pressure side 326 of the wing flap 328. Additionally, reducing the landing gear wake-wing flap interaction reduces a risk of unexpected buffet of the wing flap 328.

Figure 4:
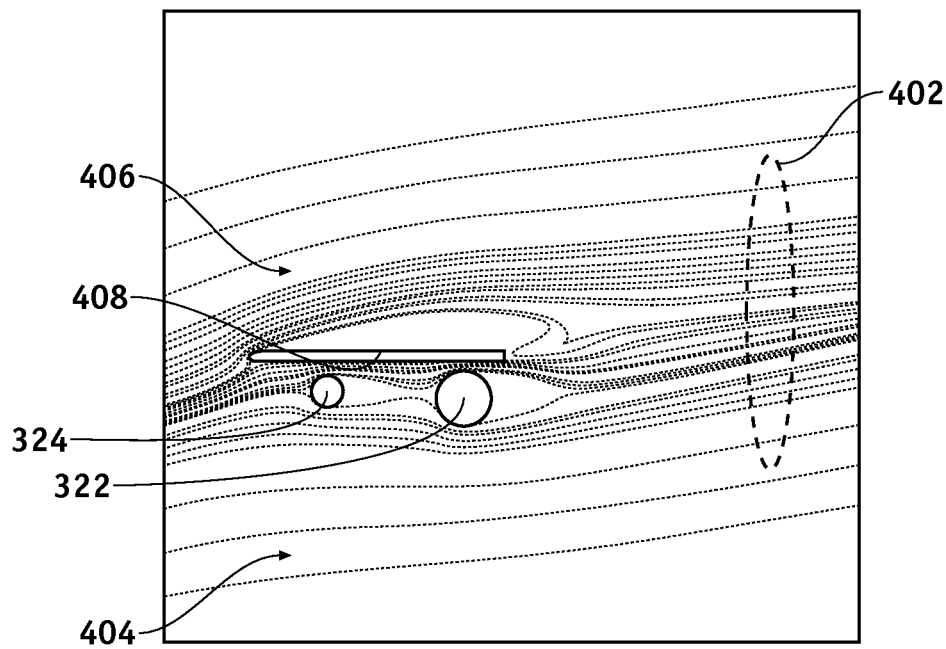
FIG. 4 is an illustration of an exemplary section view of an existing landing gear door showing a landing gear wake that can impinge on fluid dynamic surfaces thereby generating landing gear wake-wing flap interaction noise.

FIG. 4 is an illustration of an exemplary section view of an existing landing gear door 408 showing the landing gear wake 402 that can impinge on fluid dynamic surfaces such as on the pressure side 326 of the wing flap 328. The landing gear wake 402 interacts with fluid dynamic surfaces such as on the wing flap 328 and may generate a landing gear wake-wing flap interaction noise. The fluid dynamic surfaces may comprise, for example but without limitation, aerodynamic surfaces such as a flap, a spoiler, an aileron, or other fluid dynamic surfaces cable of moving through a fluid such as air and/or water.

FIG. 5 is an illustration of an exemplary section view of the door flap 308 in the door flap deployed position 502 and the leading edge section 306 in a leading edge deployed position 504 according to an embodiment of the disclosure. Deflecting the door flap 308 and the leading edge section 306 reduces a local flow velocity 508 on a pressure side 506 of the door flap 308 near the landing gear strut 322 and the landing gear braces 324. Reducing the local flow velocity 508 or local speed of the local flow velocity 508 near the landing gear strut 322 minimizes the landing gear wake 402 impinging on the pressure side 326 of an aerodynamic surface such as the wing flap 328 of the aircraft 200.

In this manner, the landing gear wake 402 (FIGS. 4 and 5) impinging on the pressure side 326 of the wing flap 328 is reduced, thereby reducing landing gear wake-wing flap interaction noise generated by interaction of the landing gear wake 402 from the landing gear strut 322 and the landing gear braces 324 with the wing flap 328. Reducing the local flow velocity also reduces a landing gear strut noise of the landing gear strut 322.

Since landing gear noise generally increases in proportion to (Mach)$^5$, a small reduction in the local flow velocity 508 can have a significant impact on landing gear door noise and landing gear wake-aerodynamic surface interaction noise. The landing gear door wake-wing flap interaction noise and landing gear noise may be reduced by, for example, about 2 dB to about 5 dB, which for gear dominated airframe noise can be significant.

FIGS. 6-12 are illustrations of section views showing a free stream flow 602 over the landing gear door 304 (main landing gear door 304) at, without limitation, 8 degrees angle of incidence at various door flap deflection angles 702 according to an embodiment of the disclosure. As shown in FIGS. 6-12 strength of the landing gear wake 402 reduces as the door flap deflection angles 702 increase from, for example, about zero to about 30 degrees. The landing gear wake 402 may grow at higher door flap deflection angles 702 (e.g., >30 degrees), indicating an example nominal door flap deflection angles 702 may be, for example, below 30 degrees.

Figure 13:
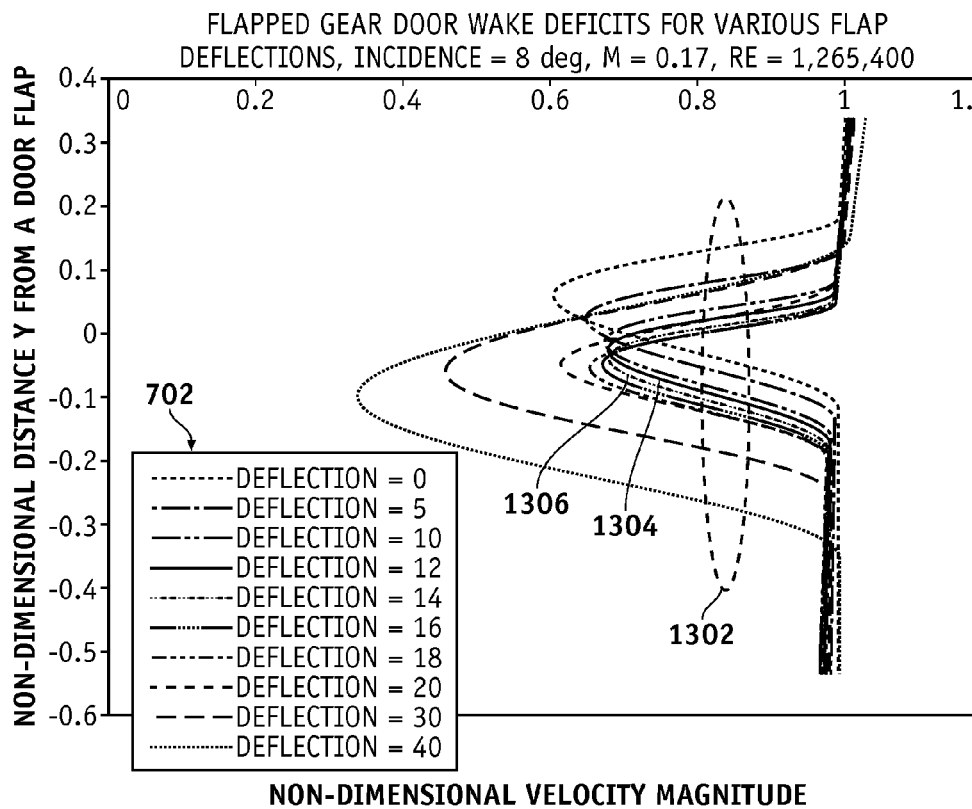
FIG. 13 is an illustration of a graph showing a landing gear door wake deficit at various door flap deflection angles according to an embodiment of the disclosure.

FIG. 13 is an illustration of a graph 1300 showing a wake deficit 1302 of the landing gear wake 402 at various door flap deflection angles 702. The wake deficit 1302 is measured with the landing gear door 304 at, without limitation, 8 degrees angle of incidence, the free stream flow 602 at, without limitation, Mach 0.17 and Reynolds number (RE) of 1265400 according to an embodiment of the disclosure. The graph 1300 shows a non-dimensional distance Y from the landing gear door 304 (e.g., normalized by a chord length of the landing gear door 304) vs. a non-dimensional velocity magnitude. The wake deficit 1302 shows that the door flap 308 at the door flap deflection angles 702 of, for example, 12 degrees and 14 degrees generates minimum momentum loss in the landing gear wake 402 as shown by curves 1304 and 1306 respectively.

Figure 14:
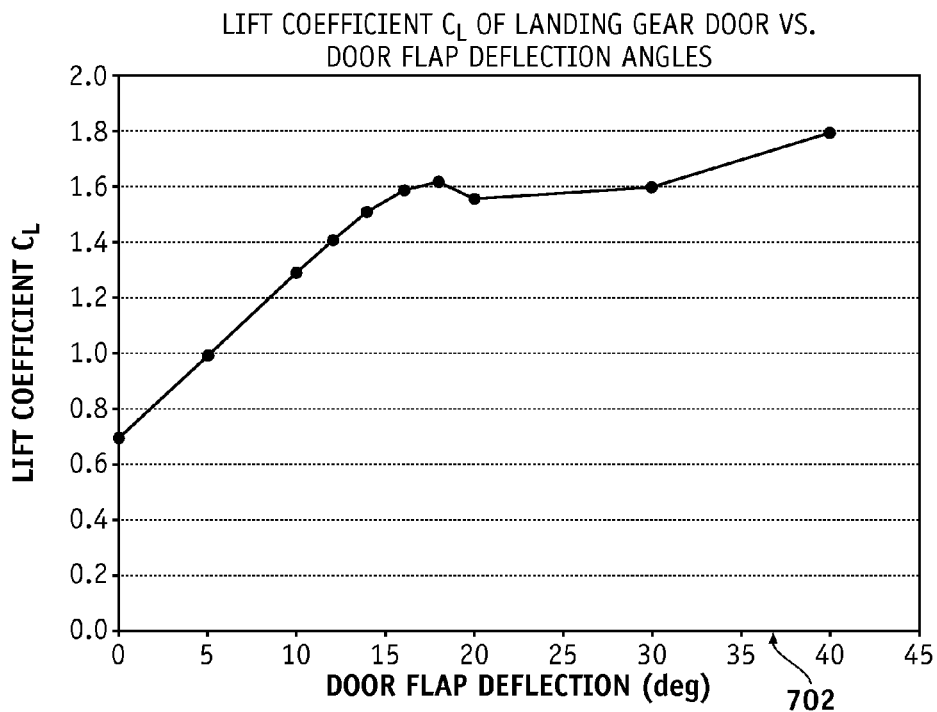
FIG. 14 is an illustration of a graph showing a lift coefficient $C_L$ of the landing gear door vs. door flap deflection angles in degrees according to an embodiment of the disclosure.

FIG. 14 is an illustration of a graph 1400 showing a lift coefficient $C_L$ of the landing gear door 304 vs. door flap deflection angles 702 of the door flap 308 in degrees according to an embodiment of the disclosure. The graph 1400 illustrates that beyond about 15 degrees of door flap deflection angle 702 the lift coefficient $C_L$ flattens and there is substantially no more additional circulation and hence substantially no substantial velocity reduction can be obtained around the landing gear strut 322.

Figure 15:
FIG. 15 is an illustration of a graph showing a landing gear wake-wing flap interaction noise reduction due to deploying a landing gear door according to an embodiment of the disclosure compared to a landing gear wake-wing flap interaction noise generated when using an existing landing gear door.

FIG. 15 is an illustration of a graph 1500 showing a landing gear wake-wing flap interaction noise reduction due to deploying the landing gear door 304 according to an embodiment of the disclosure compared to a landing gear wake-wing flap interaction noise generated when using an existing main landing gear door. A curve 1502 shows sound pressure level (SPL) in dB vs. frequency in Hertz (Hz) for noise generated when the landing gear door 304 is in the landing gear door deployed position 314 with the door flap 308 and the leading edge section 306 deflected toward the landing gear strut in the direction 330. A curve 1504 shows SPL in dB vs. frequency in Hz for noise generated without deploying the landing gear door 304. The curve 1502 shows the landing gear wake-wing flap interaction noise is reduced by about 3-5 dB in the landing gear door deployed position 314.

Figure 16:
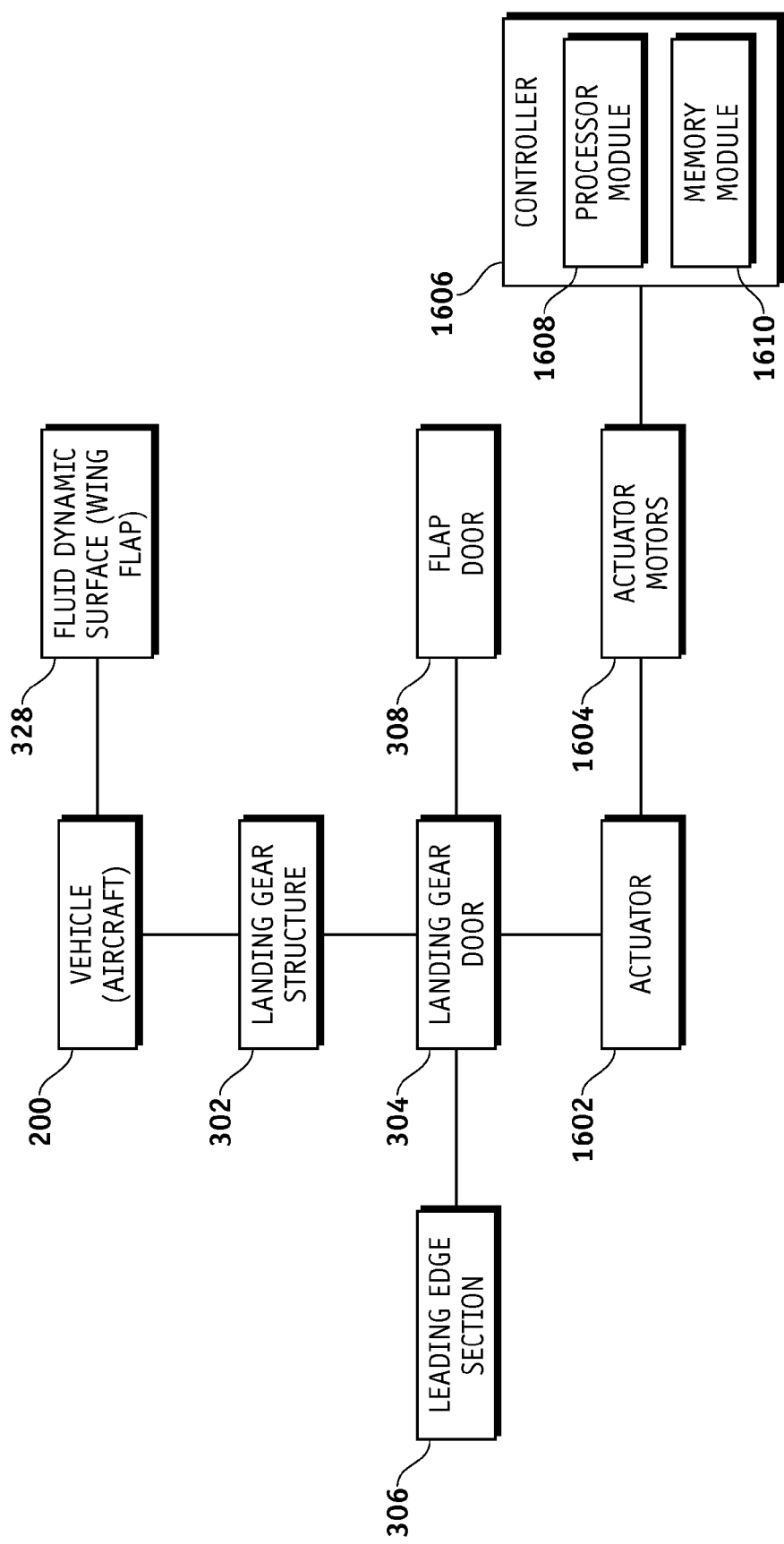
FIG. 16 is an illustration of an exemplary block diagram of a landing gear door system according to an embodiment of the disclosure.

FIG. 16 is an illustration of a block diagram of a landing gear door system 1600 (system 1600) according to an embodiment of the disclosure. The system 1600 may have functions, material, and structures that are similar to the embodiments shown in FIGS. 3, 5, and 6-12. Therefore, common features, functions, and elements may not be redundantly described here.

The system 1600 may comprise a vehicle 200 such as the aircraft 200, a fluid dynamic surface such as the wing flap 328 coupled to the aircraft 200, the landing gear structure 302 coupled to the aircraft 200 and the landing gear door 304. The leading edge section 306 is coupled to the landing gear door 304 and the door flap 308 may be hinged to the landing gear door 304.

An actuator 1602 is coupled to the landing gear door 304. The actuator 1602 is configured to deploy the landing gear door 304 in the landing gear door deployed position 314, the leading edge section 306 in the leading edge deployed position 504 and the door flap 308 in the door flap deployed position 502 to reduce landing gear wake 402 (FIGS. 4 and 5) impinging on the pressure side 326 of the wing flap 328, thereby reducing landing gear wake-wing flap interaction noise generated by interaction of the landing gear wake 402 from the landing gear strut 322 and the landing gear braces 324 with the wing flap 328.

The actuator 1602 may deflect the door flap 308 at various door flap deflection angles 702 as explained above in the context of discussion of FIG. 7. The actuator 1602 may comprise, for example but without limitation, a linear hydraulic actuator, a ball screw actuator, or other actuator.

The controller 1606 may be implemented as, for example but without limitation, a part of an aircraft system, a centralized aircraft processor, a subsystem computing module comprising hardware and/or software devoted to the system 1600, or other processor.

The controller 1606 is configured to control the actuation motors 1604 to actuate the landing gear door 304 via the actuator 1602 to the landing gear door deployed position 314, the leading edge section 306 to the leading edge section deployed position 504 and the door flap 308 to the door flap deployed position 502 via the actuator 1602 according to various operation conditions. The operation conditions may comprise, for example but without limitation, flight conditions, ground operations, or other condition. The flight conditions may comprise, for example but without limitation, landing, or other flight condition. The ground operations may comprise, for example but without limitation, air breaking after landing, taxing, parking, or other ground operation. The controller 1606 may be located remotely from the actuation motors 1604, or may be coupled to the actuation motors 1604. In one embodiment, the controller 1606 may be placed in a cockpit of the aircraft 200.

The controller 1606 may comprise a processor module 1608 comprising processing logic that is configured to carry out the functions, techniques, and processing tasks associated with the operation of the system 1600. In particular, the processing logic is configured to support the system 1600 described herein. For example, the processor module 1608 may direct the actuation motors 1604 to deflect the leading edge section 306 and the door flap 308 via the actuator 1602.

The processor module 1608 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices comprising hardware and/or software, e.g., a combination of a digital signal processor and a microprocessor, a plurality of microprocessors, one or more microprocessors in conjunction with a digital signal processor core, or any other such configuration.

The memory module 1610 may comprise a data storage area with memory formatted to support the operation of the system 1600. The memory module 1610 is configured to store, maintain, and provide data as needed to support the functionality of the system 1600. For example, the memory module 1610 may store flight configuration data, actuation signal(s) for activation of the actuation motors 1604, the door flap deflection angles 702 of the door flap 308, or other data.

In some embodiments, the memory module 1610 may comprise, for example but without limitation, a non-volatile storage device (e.g., non-volatile semiconductor memory, hard disk device, optical disk device, and the like), a random access storage device (for example, SRAM, DRAM), or any other form of storage medium known in the art.

The memory module 1610 may be coupled to the processor module 1608 and configured to store, for example but without limitation, a database, and the like. Additionally, the memory module 1610 may represent a dynamically updating database containing a table for updating the database, or other application. The memory module 1610 may also store, a computer program that is executed by the processor module 1608 an operating system, an application program, tentative data used in executing a program, or other application.

The memory module 1610 may be coupled to the processor module 1608 such that the processor module 1608 can read information from and write information to the memory module 1610. For example, the processor module 1608 may access the memory module 1610 to access the door flap deflection angles 702, an activation command, or other data.

As an example, the processor module 1608 and memory module 1610 may reside in respective application specific integrated circuits (ASICs). The memory module 1610 may also be integrated into the processor module 1608. In an embodiment, the memory module 1610 may comprise a cache memory for storing temporary variables or other intermediate information during execution of instructions to be executed by the processor module 1608.

Figure 17:
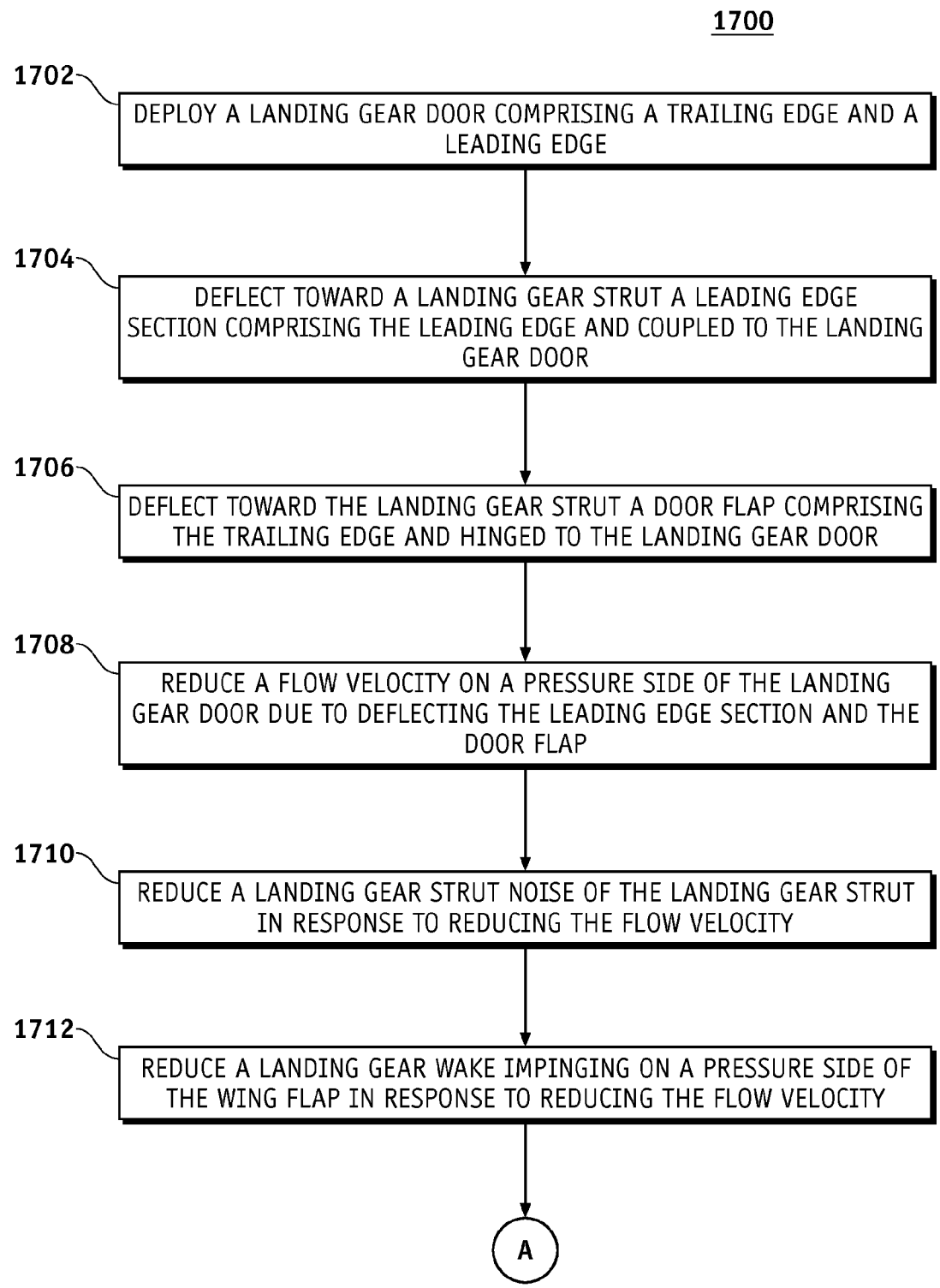
FIG. 17 is an illustration of an exemplary flowchart showing a process for reducing landing gear wake-wing flap interaction noise according to an embodiment of the disclosure.
Figure 17:
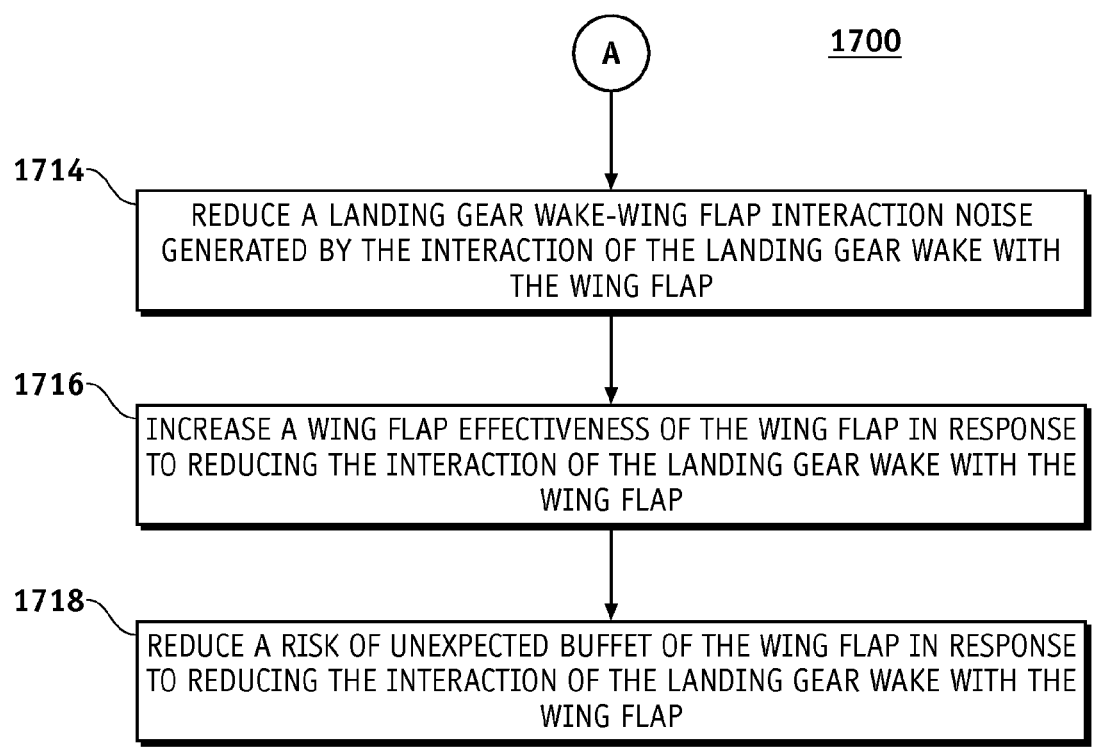

FIG. 17 is an illustration of an exemplary flowchart showing a process for reducing landing gear wake-wing flap interaction noise according to an embodiment of the disclosure. The various tasks performed in connection with process 1700 may be performed mechanically, by software, hardware, firmware, computer-readable software, computer readable storage medium, or any combination thereof. It should be appreciated that process 1700 may include any number of additional or alternative tasks, the tasks shown in FIG. 17 need not be performed in the illustrated order, and the process 1700 may be incorporated into a more comprehensive procedure or process having additional functionality not described in detail herein.

For illustrative purposes, the following description of process 1700 may refer to elements mentioned above in connection with FIGS. 1-16. In some embodiments, portions of the process 1700 may be performed by different elements of the system 1600 such as: the landing gear door 304, the door flap 308, the leading edge section 306, the actuator 1602 etc. It should be appreciated that process 1700 may include any number of additional or alternative tasks, the tasks shown in FIG. 17 need not be performed in the illustrated order, and the process 1700 may be incorporated into a more comprehensive procedure or process having additional functionality not described in detail herein. Process 1700 may have functions, material, and structures that are similar to the embodiments shown in FIGS. 3, 5, and 6-15. Therefore, common features, functions, and elements may not be redundantly described here.

Process 1700 may begin by deploying a landing gear door such as the landing gear door 304 comprising a trailing edge such as the trailing edge 310 and a leading edge such as the leading edge 312 (task 1702).

Process 1700 may continue by deflecting toward a landing gear strut such as the landing gear strut 322 a leading edge section such as the leading edge section 306 comprising the leading edge 312 and coupled to the landing gear door 304 (task 1704).

Process 1700 may continue by deflecting toward the landing gear strut 322, a door flap such as the door flap 308 comprising the trailing edge 310 and hinged to the landing gear door 304 (task 1706).

Process 1700 may continue by reducing a flow velocity on a pressure side of the landing gear door 304 due to deflecting the leading edge section 306 and the door flap 304 (task 1708).

Process 1700 may continue by reducing a landing gear strut noise of the landing gear strut 322 in response to reducing the flow velocity (task 1710).

Process 1700 may continue by reducing a landing gear wake such as the landing gear wake 402 impinging on a pressure side such as the pressure side 326 of a wing flap such as the wing flap 328 in response to reducing the flow velocity (task 1712). The leading edge section 306 reduces separation on the landing gear door 304, and thus reduces the wake deficit 1302. In the door flap deployed position 502, the deflected door flap 308 on the trailing edge 310 causes circulation around the landing gear strut 322, thereby reducing the local flow velocity 508. Reducing the local flow velocity 508 also reduces viscous losses around the landing gear strut 322, and thus reduces the landing gear wake 402 downstream of the landing gear strut 322.

Process 1700 may continue by reducing a landing gear wake-wing flap interaction noise generated by the interaction of the landing gear wake 402 with the wing flap 328 (task 1714).

Process 1700 may continue by increasing a wing flap effectiveness of the wing flap 328 in response to reducing the interaction of the landing gear wake 402 with the wing flap 328 (task 1716).

Process 1700 may continue by reducing a risk of unexpected buffet of the wing flap 328 in response to reducing the interaction of the landing gear wake 402 with the wing flap 328 (task 1718).

Figure 18:
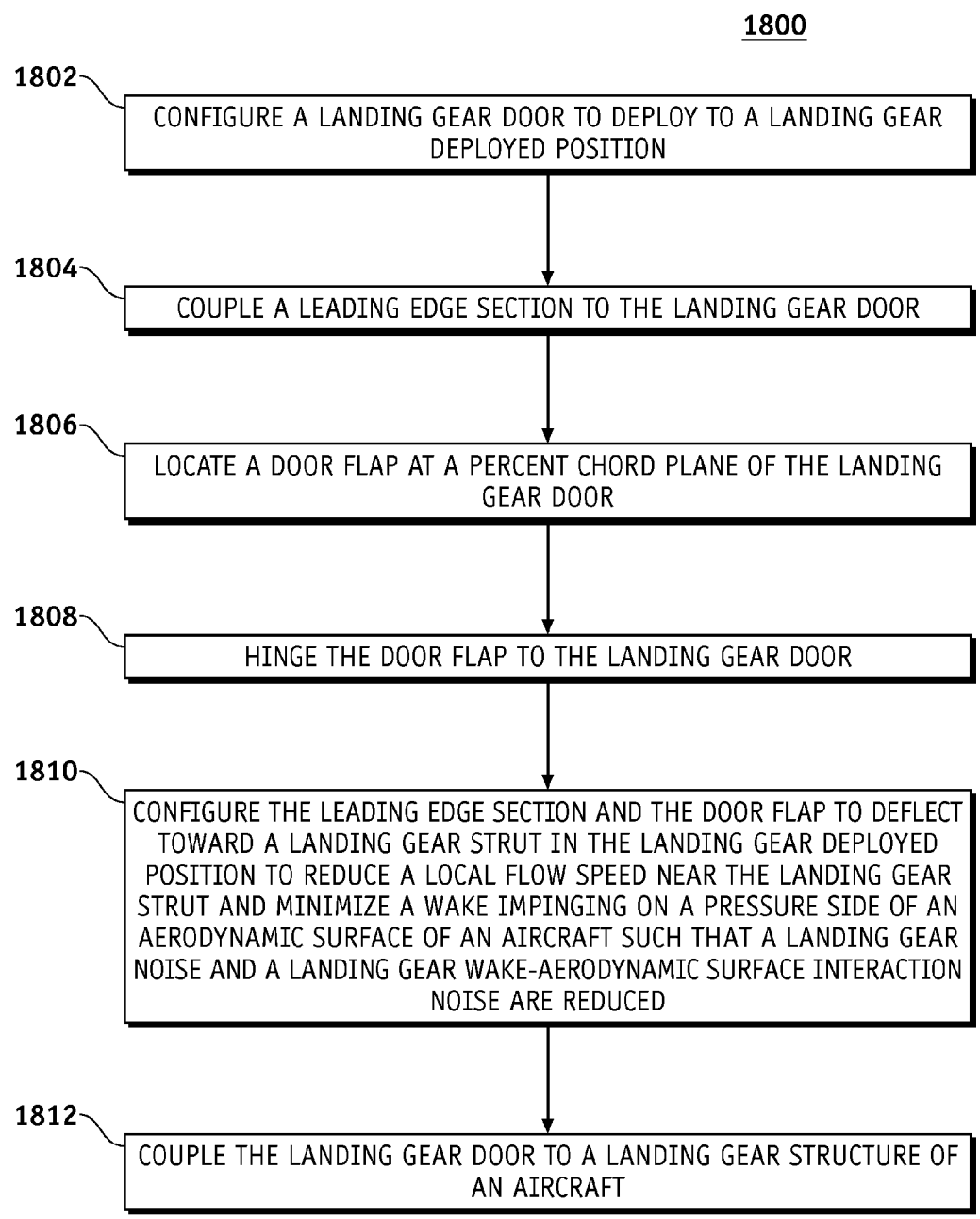
FIG. 18 is an illustration of an exemplary flowchart showing a process for configuring a quiet landing gear door according to an embodiment of the disclosure.

FIG. 18 is an illustration of an exemplary flowchart showing a process 1800 for configuring a quiet (low noise) landing gear door according to an embodiment of the disclosure. The various tasks performed in connection with process 1800 may be performed mechanically, by software, hardware, firmware, computer-readable software, computer readable storage medium, or any combination thereof. It should be appreciated that process 1800 may include any number of additional or alternative tasks, the tasks shown in FIG. 18 need not be performed in the illustrated order, and the process 1800 may be incorporated into a more comprehensive procedure or process having additional functionality not described in detail herein.

For illustrative purposes, the following description of process 1800 may refer to elements mentioned above in connection with FIGS. 1-16. In some embodiments, portions of the process 1800 may be performed by different elements of the system 1600 such as: the landing gear door 304, the door flap 308, the leading edge section 306, the actuator 1602, etc. It should be appreciated that process 1800 may include any number of additional or alternative tasks, the tasks shown in FIG. 18 need not be performed in the illustrated order, and the process 1800 may be incorporated into a more comprehensive procedure or process having additional functionality not described in detail herein. Process 1800 may have functions, material, and structures that are similar to the embodiments shown in FIGS. 3, 5, and 6-15. Therefore, common features, functions, and elements may not be redundantly described here.

Process 1800 may begin by configuring a landing gear door such as the landing gear door 304 to deploy to a landing gear deployed position such as the landing gear deployed position 314 (task 1802).

Process 1800 may continue by coupling a leading edge section such as the leading edge section 306 to the landing gear door 304 (task 1804).

Process 1800 may continue by locating a door flap such as the door flap 308 at a percent chord plane of a landing gear door 304 (task 1806).

Process 1800 may continue by hinging the door flap 308 to the landing gear door 304 (task 1808).

Process 1800 may continue by configuring the leading edge section 306 and the door flap 308 to deflect toward a landing gear strut such as the landing gear strut 322 in the landing gear deployed position 314 to reduce a local flow speed near the landing gear strut 322 and minimize wake impinging on a pressure side such as the pressure side 326 of an aerodynamic surface such as the wing flap 328 of an aircraft such as the aircraft 200 such that a landing gear noise and landing gear wake-aerodynamic surface interaction noise are reduced (task 1810).

Process 1800 may continue by coupling the landing gear door to a landing gear structure such as the landing gear structure 302 of an aircraft such as the aircraft 200 (task 1812).

In this way, embodiments of the disclosure provide a quiet (reduced noise) landing gear door that reduces a landing gear noise and landing gear wake-aerodynamic surface interaction noise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-3, 4-16 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, storage unit, or other non-transitory media. These and other forms of computer-readable media may be involved in storing one or more instructions for use by the processor module 1608 to cause the processor module 1608 to perform specified operations. Such instructions, generally referred to as "computer program code" or "program code" (which may be grouped in the form of computer programs or other groupings), when executed, enable the system 1600.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A quiet landing gear door comprising:
   a landing gear door comprising a trailing edge and a leading edge and operable to deploy to a landing gear door deployed position;
   a door flap comprising the trailing edge and hinged to the landing gear door and the door flap deflects toward a landing gear strut to a door flap deployed position in response to deployment of the landing gear door; and
   a leading edge section comprising the leading edge and coupled to landing gear door and the leading edge section deflects toward the landing gear strut to a leading edge section deployed position in response to deployment of the landing gear door.

2. The quiet landing gear door of claim 1, wherein the leading edge section in the leading edge section deployed position and the door flap in the door flap deployed position reduces a flow velocity on a pressure side of the landing gear door reducing a landing gear wake-wing flap interaction noise.

3. The quiet landing gear door of claim 2, wherein a nominal door flap deflection angle is below 30 degrees.

4. The quiet landing gear door of claim 2, wherein the leading edge section in the leading edge section deployed position and the door flap in the door flap deployed position reduce the landing gear wake-wing flap interaction noise generated by a landing gear wake-wing flap interaction.

5. The quiet landing gear door of claim 4, wherein the leading edge section in the leading edge deployed position and the door flap in the door flap deployed position reduce a landing gear wake impinging on a pressure side of a wing flap reducing the landing gear wake-wing flap interaction and the landing gear wake-wing flap interaction noise.

6. The quiet landing gear door of claim 5, wherein reducing the landing gear wake-wing flap interaction increases effectiveness of the wing flap.

7. The quiet landing gear door of claim 4, wherein reducing the landing gear wake-wing flap interaction reduces a risk of unexpected buffet of the wing flap.

8. The quiet landing gear door of claim 1, wherein the door flap is located at a percent of a chord plane of the landing gear door.

9. The quiet landing gear door of claim 1, wherein the landing gear door is coupled to a landing gear structure of an aircraft.

10. A method for reducing landing gear noise, the method comprising:
    deploying a landing gear door comprising a trailing edge and a leading edge;
    deflecting toward a strut a leading edge section comprising the leading edge and coupled to the landing gear door;
    deflecting toward the strut a door flap comprising the trailing edge and hinged to the landing gear door; and
    reducing a flow velocity on a pressure side of the landing gear door due to deflecting the leading edge section and the door flap.

11. The method of claim 10, further comprising reducing a landing gear strut noise of the landing gear strut in response to reducing the flow velocity.

12. The method of claim 11, further comprising reducing a landing gear wake-wing flap interaction noise generated by an interaction of a landing gear wake with a wing flap.

13. The method of claim 12, wherein the door flap is located at a percent of a chord plane of the landing gear door.

14. The method of claim 11, further comprising reducing a landing gear wake impinging on a pressure side of a wing flap in response to reducing the flow velocity.

15. The method of claim 14, further comprising reducing an interaction of the landing gear wake with the wing flap in response to reducing the flow velocity.

16. The method of claim 15, further comprising increasing a wing flap effectiveness of the wing flap in response to reducing the interaction of the landing gear wake with the wing flap.

17. The method of claim 15, further comprising reducing a risk of unexpected buffet of the wing flap in response to reducing the interaction of the landing gear wake with the wing flap.

18. A method for configuring a quiet landing gear door, the method comprising:
    configuring a landing gear door to deploy to a landing gear deployed position;
    coupling a leading edge section to the landing gear door; and
    hinging a door flap to the landing gear door; wherein
    the leading edge section and the door flap deflect toward a landing gear strut in the landing gear deployed position to reduce a local flow speed near the landing gear strut and minimize a wake impinging on a pressure side of an aerodynamic surface of an aircraft such that a landing gear noise and a landing gear wake-aerodynamic surface interaction noise are reduced.

19. The method of claim 18, further comprising locating the door flap at a percent chord plane of the landing gear door.

20. The method of claim 18, further comprising coupling the landing gear door to a main landing gear structure of the aircraft.

* * * * *